United States Patent
Heckler et al.

(10) Patent No.: US 8,312,670 B2
(45) Date of Patent: Nov. 20, 2012

(54) HORTICULTURAL APPLICATOR DEVICE

(76) Inventors: Timothy Dean Heckler, Perth (AU);
Adam Matthew Wake, Perth (AU)

( * ) Notice: Subject to any disclaimer, the term of this patent is extended or adjusted under 35 U.S.C. 154(b) by 769 days.

(21) Appl. No.: 11/721,220

(22) PCT Filed: Dec. 8, 2005

(86) PCT No.: PCT/AU2005/001851
§ 371 (c)(1),
(2), (4) Date: Jun. 15, 2009

(87) PCT Pub. No.: WO2006/060863
PCT Pub. Date: Jun. 15, 2006

(65) Prior Publication Data
US 2009/0288338 A1    Nov. 26, 2009

(30) Foreign Application Priority Data

Dec. 10, 2004  (AU) ................ 2004907048
Jan. 28, 2005  (AU) ................ 2005900350

(51) Int. Cl.
*A01M 21/04* (2006.01)
*B05B 1/20* (2006.01)
*A01D 19/00* (2006.01)
*A01G 5/06* (2006.01)
*A01N 59/00* (2006.01)

(52) U.S. Cl. .............. 47/1.5; 47/1.7; 239/159; 239/172; 239/724; 56/16.8; 427/4; 504/150

(58) Field of Classification Search .............. 47/1.5, 47/1.7, 57.7, DIG. 11, 1.41; 239/159, 164, 239/172, 175, 176, 146, 170, 726, 754, 724, 239/725; 56/16.8; 427/4; 504/150; *A01C 23/00, A01C 23/02*
See application file for complete search history.

(56) References Cited

U.S. PATENT DOCUMENTS

| 851,376 | A | * | 4/1907 | Renault | 422/300 |
| 1,669,435 | A | * | 5/1928 | Willis | 47/1.7 |
| 2,330,164 | A | * | 9/1943 | Wiedenhoefer | 43/124 |
| 2,740,664 | A | * | 4/1956 | Yates | 239/104 |
| 3,009,290 | A | * | 11/1961 | Bratton | 47/1.5 |
| 3,118,607 | A | * | 1/1964 | Rocher | 239/104 |
| 3,139,060 | A | * | 6/1964 | Dane | 440/39 |
| 4,186,879 | A | * | 2/1980 | Kinder | 239/172 |
| 4,696,149 | A | * | 9/1987 | Hawk | 56/8 |
| 5,074,105 | A | * | 12/1991 | Roth | 56/8 |
| 5,155,733 | A | * | 10/1992 | Blecha, Jr. | 714/733 |
| 5,388,369 | A | * | 2/1995 | Moore | 47/1.5 |
| 5,430,970 | A | * | 7/1995 | Thompson et al. | 47/1.5 |
| 2008/0210639 | A1 | * | 9/2008 | Leistner | 210/747 |

FOREIGN PATENT DOCUMENTS

JP    8116745 A    5/1996

* cited by examiner

*Primary Examiner* — Andrea Valenti
(74) *Attorney, Agent, or Firm* — David A. Guerra

(57) ABSTRACT

A horticultural applicator having a raft, at least one cable attached to the raft, a boom associated with the raft, and a conduit in communication with the raft. The raft includes a lower surface, first and second side surfaces extending upwardly and outwardly from the lower surface at opposite ends thereof, and first and second end surfaces extending generally perpendicular from opposite ends of the lower surface between the first and second side surfaces. The cable is used to drag the raft over a surface containing vegetation. The boom is adapted to apply a substance onto the vegetation traveling below the lower surface of the raft.

6 Claims, 2 Drawing Sheets

HORTICULTURAL APPLICATOR DEVICE

CROSS-REFERENCE TO RELATED APPLICATIONS

This application is an U.S. national phase application under 35 U.S.C. §371 based upon co-pending International Application No. PCT/AU2005/001851 filed on Dec. 8, 2005. Additionally, this U.S. national phase application claims the benefit of priority of co-pending International Application No. PCT/AU2005/001851 filed on Dec. 8, 2005, Australian Application No. 2004907048 filed on Dec. 10, 2004, and Australian Application No. 2005900350 filed on Jan. 28, 2005. The entire disclosures of the prior applications are incorporated herein by reference. The international application was published on Jun. 15, 2006 under Publication No. WO 2006/060863 A1.

FIELD OF THE INVENTION

The present invention relates a horticultural applicator device for carrying a spray boom or similar device used to deliver substances such as herbicides to areas that are difficult to access.

BACKGROUND OF THE INVENTION

It is often desired to apply herbicides to control weeds such as typha that grow in seasonally inundated lakes. Spraying such weeds is a difficult task due to problems gaining access to the weed. The known method requires wading through the area and manually spraying the weed. This method is extremely time consuming and strenuous for the person spraying. It is also difficult to achieve an effective result and hazardous to the operator due to venomous or otherwise dangerous fauna that live in such areas.

It is known to use boom sprays or other application means in many areas of agriculture, horticulture and natural area management. Such application means are generally mounted on, or towed by a vehicle and allow even spraying over a wide area. The use of boom sprays in areas such as mentioned above however is impractical, as it is not possible to gain access to these areas with a vehicle. Other devices such as a wiping wick applicator system can also be used but still have the same access problem.

The present invention attempts to overcome at least in part the aforementioned problems of spraying plants in difficult to access areas.

SUMMARY OF THE INVENTION

In accordance with one aspect of the present invention there is provided a horticultural applicator device comprising a raft having a means for applying a substance to plants and a means to drag the raft, wherein the raft is dragged over the top of the plants and the means for applying the substance mounted to the raft applies the substance onto said plants.

BRIEF DESCRIPTION OF THE DRAWINGS

The present invention will now be described, by way of example, with reference to the accompanying drawings, in which.

DESCRIPTION OF THE INVENTION

Figure 1:
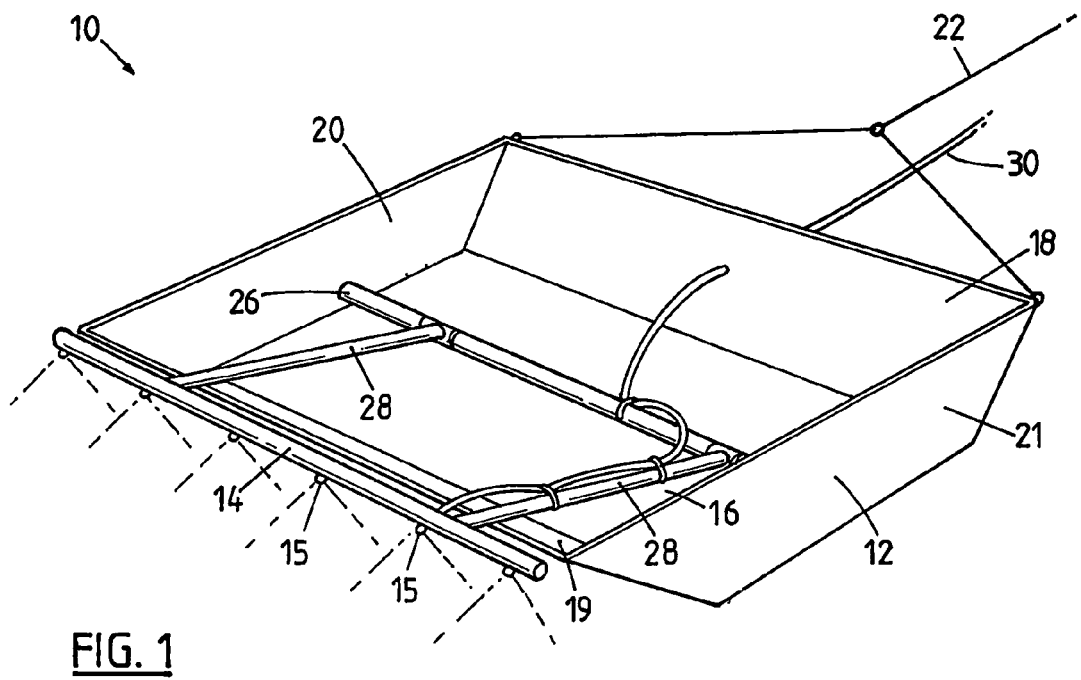
FIG. 1 is an upper perspective view of a horticultural applicator in accordance with the present invention.

Referring to the Figures, there is shown a horticultural applicator device 10 including a raft 12 and a means for applying a substance, such as a herbicide, to plants.

The raft 12 comprises an open top vessel having a lower surface 16, first and second opposed side surfaces 18 and 19 and first and second opposed end surfaces 20 and 21. The lower surface 16 is generally planar. The first and second opposed end surfaces 20 and 21 extend generally upwardly from and perpendicular to the lower surface 16 at opposite ends thereof. The first and second side surfaces 18 and 19 extend upwardly from opposite sides of the lower surface 16 at an angle less than 90 degrees. The angle of the first and second side surfaces 18 and 19 to the lower surface 16 is such that, when the raft 12 is dragged along in the direction of one of the side surfaces 18, the angle of the side surfaces 18 and 19 allow the raft 12 to slide up and onto plants to be sprayed.

The raft 12 includes a means for dragging the raft 12 in the direction of either of the first or second side surfaces 18 and 19. The means for dragging the raft 12 comprises a first cable 22 attached to the first side surface 18 and a second cable 24 attached to the second side surface 19.

Figure 2:
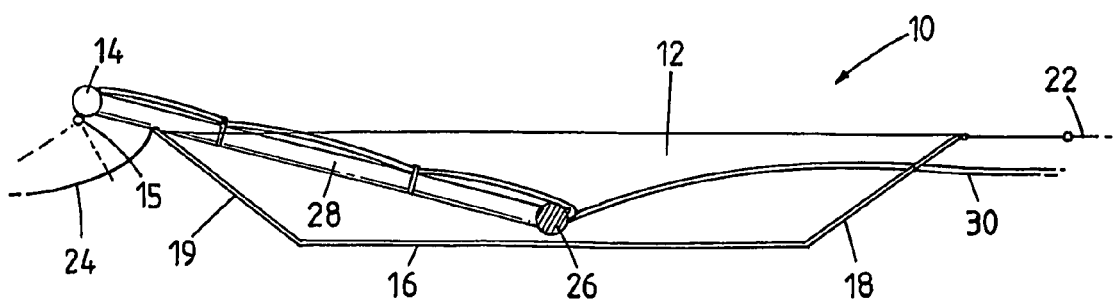
FIG. 2 is a side cross sectional view of the horticultural applicator of FIG. 1.

In the embodiment shown in FIGS. 1 and 2, the means for applying a substance comprises a boom 14 having a plurality of spray nozzles 15 located thereon. The boom 14 is pivotally mounted about a central elongate member 26 on the raft 12. The elongate member 26 extends across the raft 12 from the first end surface 20 to the second end surface 21. The boom 14 is mounted parallel to the elongate member 26 at the end of arm members 28 arranged to pivot about the elongate member 26. The length of the arm members 28 is such that the boom 14 can be pivoted between a position in which it lies beyond the extents of the raft 12 adjacent the first side surface 18 and a position in which it lies beyond the extents of the raft 12 adjacent the second side surface 19. A flexible feed conduit 30 is provided to supply the fluid to be sprayed to the nozzles 15 on the boom 14.

In the embodiment shown, the boom 14 is arranged to spray a fluid, such as herbicide, onto the plants. In an alternative embodiment, the means for applying a substance to the plants may comprise a boom having wick style applicators in which the wicks contact the plants and deliver the herbicide. The wick applicators may alternatively be mounted directly to the raft 12, without the use of the boom 14. It is also envisaged that other substances may be applied. For example, it may be desired to apply pesticides or fertilisers to the plants. The means of applying the substance, such as spray jets, wick or other suitable means, will be selected based on the particular application.

Figure 3:
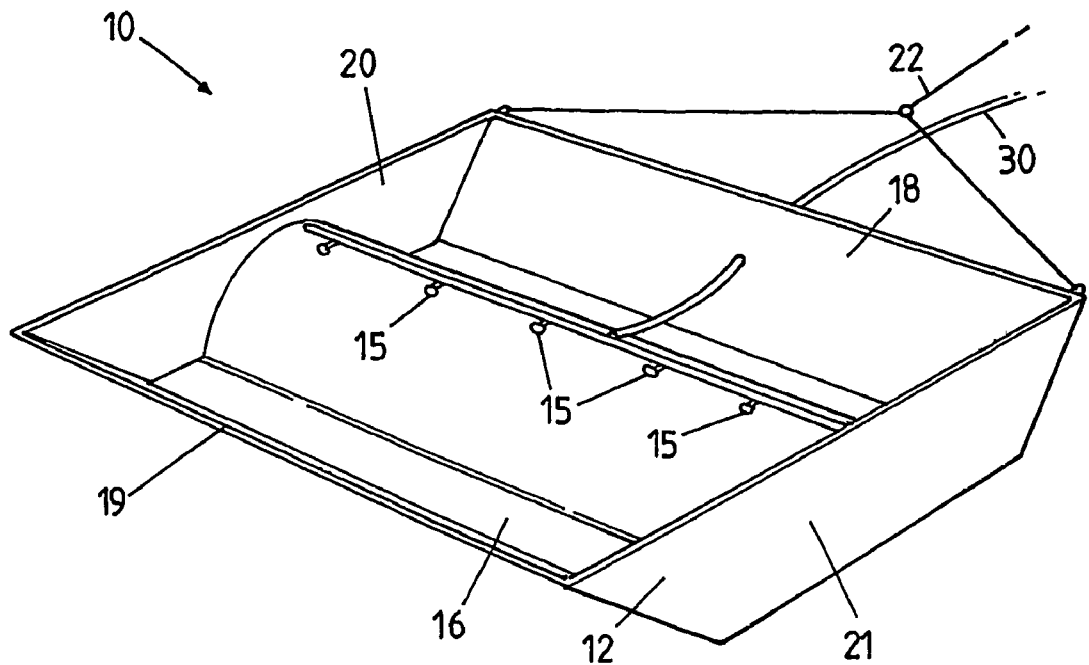
FIG. 3 is an upper perspective of an alternative embodiment of a horticultural applicator in accordance with the present invention.
Figure 4:
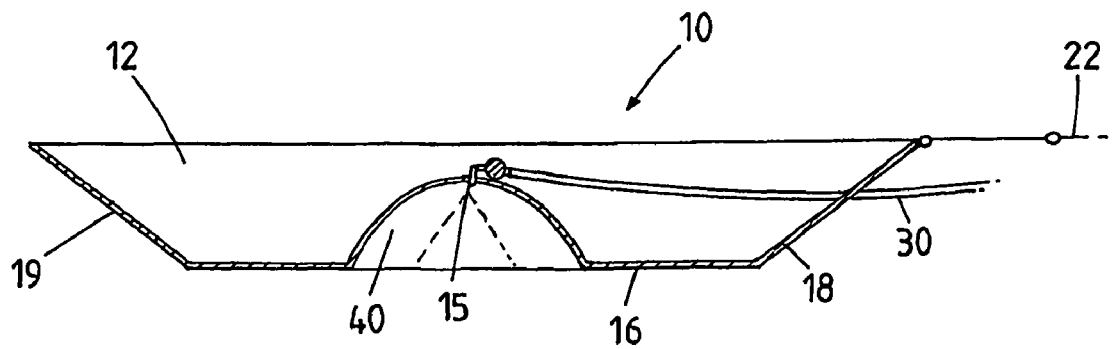
FIG. 4 is a side cross sectional view of the horticultural applicator of FIG. 3.

The embodiment shown in FIGS. 3 and 4, the means for applying a substance comprises a plurality of spray nozzles 15 located on the lower surface 16 of the raft 12. The lower surface 16 is provided with a recessed portion 40 extending from the first end surface 20 to the second end surface 21 in which the spray nozzles 15 are located. The spray nozzles 15 apply the sprayed substance to the area below the recessed portion 40. The recessed portion 40 is generally semi-circular in cross section having the nozzles 15 mounted along the length thereof. A flexible feed conduit 30 connected to the nozzles 15 from within the raft 12 supplies the substance to be sprayed to the nozzles 15.

In use, when using the applicator device of FIGS. 1 and 2, the raft 12 is positioned adjacent an area to be sprayed with the first cable 22 extending across the area to be sprayed and the boom 14 positioned adjacent the second side surface 18 (as shown in FIG. 1). A force is applied to the first cable 22 by suitable means, such as a winch, to drag the raft 12 across the plants to be sprayed. The angled first side surface 18 allows the raft to pass on top of the plants, bending the plants over. The nozzles 15 spray the desired fluid (for example herbicide) onto the plants passing out from under the second side surface 19.

The lower surface 16 and first and second side surfaces 18 and 19 of the raft 12 are constructed from a material having a low coefficient of friction such that the raft 12 can be easily dragged across these surfaces. Also the raft 12 is constructed such that the weight of the raft 12 allows the raft 12 to be dragged over top of the plant to be sprayed in a manner that bends the plant but allows the plant to return to an upright position. For example, with weeds such as typha, it is preferred that the weight be such that approximately the top one third of the plant is bent over. The bending over of the plant allows more efficient spraying as the fluid is sprayed onto the side surface of the plant, at the optimal distance from the boom 14, resulting in maximum coverage and minimal pressure and flow. The 'bending over' of the canopy minimises over-spraying and the off-target damages to native understorey this would cause.

When the raft 12 reaches the end of the area to be sprayed, it may be returned to the starting position by applying a force to the second cable 24, where it can be moved across to spray an adjacent area. Alternatively, the boom spray 14 may be pivoted about the elongate member 26 so it is adjacent the first side surface 18, the raft 12 moved across by the width of the raft 12 and then dragged back in the direction of the second side surface 19 spraying along the way.

The use of the embodiment shown in FIGS. 3 and 4 will be the same but will eliminate the need to pivot the boom 14 when changing the direction of movement of the raft 12.

Modifications and variations as would be apparent to a skilled addressee are deemed to be within the scope of the present invention.

The invention claimed is:

1. A horticultural applicator system for delivering substances including herbicides, pesticides, and fertilizers to areas that are difficult to access, said horticultural applicator system comprising:

a raft being an open top vessel comprising a lower surface, first and second side surfaces extending upwardly and angled outwardly from said lower surface at opposite ends thereof, and first and second end surfaces extending generally perpendicular from opposite ends of said lower surface and said first and second end surfaces each extend continuously from said first side surface to said second side surface respectively, said lower surface further comprising a generally semi-circular section extending upwardly from said lower surface between said first and second side surfaces, said semi-circular section defines a recess in communication with plants below said raft;

at least one cable attachable to said raft and configured to drag said raft, wherein said raft is dragged over the top of the plants;

at least one spray nozzle fitted through said semi-circular section, said spray nozzle being configured to apply a substance onto plants traveling below said lower surface of said raft when the plants are in communication with said recess; and a boom attachable to said spray nozzle, said boom being configured to supply the substance to said spray nozzle; wherein said semi-circular section extends from and contained completely between said first end surface to said second end surface.

2. The horticultural applicator system as set forth in claim 1, wherein said first and second side surfaces are generally planar and extend from opposite ends of said lower surface at an angle of less than ninety degrees, said angle of said first side surface equals said angle of said second side surface.

3. The horticultural applicator system as set forth in claim 2, wherein said angle of said first and second side surfaces is configured to allow said raft to slide up and onto the plants.

4. The horticultural applicator system as set forth in claim 2, wherein said lower surface of said raft is a first lower surface, and a second lower surface substantially planar with said first lower surface, said first lower surface being located between said semi-circular section and said first side surface, and said second lower surface being located between said semi-circular section and said second side surface.

5. The horticultural applicator system as set forth in claim 1, wherein said spray nozzle is a plurality of spray nozzles.

6. The horticultural applicator system as set forth in claim 1, wherein said first side surface extends from an entire length of a first end of said lower surface, and said second side surface extends from an entire length of a second end of said lower surface.

* * * * *